Aug. 2, 1960 G. A. SAUM ET AL 2,947,896

ELECTROSTATIC DEFLECTION AND FOCUSING SYSTEM

Filed Feb. 9, 1959 2 Sheets-Sheet 1

Inventors:
George A. Saum,
Rowland W. Redington,
by Richard R. Brainard
Their Attorney.

ELECTROSTATIC DEFLECTION AND FOCUSING SYSTEM

Filed Feb. 9, 1959 2 Sheets-Sheet 2

Inventors:
George A. Saum,
Rowland W. Redington,
by Richard R. Brainard
Their Attorney.

2,947,896

ELECTROSTATIC DEFLECTION AND FOCUSING SYSTEM

George A. Saum and Rowland W. Redington, Schenectady, N.Y., assignors to General Electric Company, a corporation of New York Filed Feb. 9, 1959, Ser. No. 792,459

7 Claims. (Cl. 313—78)

Figure 1:
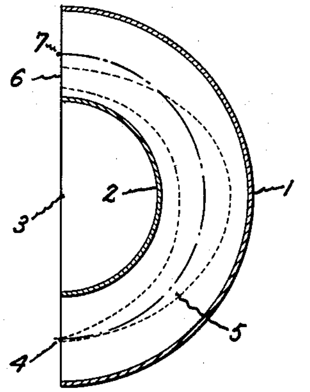

The present invention relates to an electrostatic deflecting and focusing system, and more particularly to an electrostatic deflection and focusing system especially suited for infrared camera tube applications.

The present application is a continuation-in-part of application Serial No. 783,470, filed December 29, 1958, now abandoned.

Infrared detecting systems make use of the fact that all physical objects—ground, buildings, people, vehicles, etc.—emit infrared radiation. The amount and kind of radiation depends upon the temperature of the object and its emissivity. Thus, when viewed by an appropriate infrared detecting system, any object at a different effective temperature stands out from its surroundings.

To be useful, infrared detecting systems need high-sensitivity detectors. The function of the detector is to produce an electrical signal corresponding to absorbed infrared energy.

Detectors vary from simple point types to high-resolution imaging devices. If spatial resolution is desired of a point detector, it is used in conjunction with an optical system which scans the area under surveillance. The detector then receives radiation from only part of the scene at a time. Better resolution and sensitivity are obtained by using arrays of point detectors. Most desirable, because of its simplicity, is a true imaging device which receives and integrates the effective radiation from all of the scene all of the time. An excellent device, therefore, is a camera somewhat similar to those now used in commercial and industrial television, but responsive to infrared rather than visible radiation.

An infrared camera tube of this nature is described and claimed in the copending application Serial No. 704,056, filed December 20, 1957, and assigned to the assignee of the present invention. In this tube, voltages on two pairs of concentric hemispherically-shaped electrodes deflect and focus an electron beam along a path extending through two different 180° paths from a point source to a target. This circuitous electron beam path functions with an infrared absorbing coating on the electrodes to prevent infrared radiation emanating from the heated cathode at the source from reaching the target. The target should be shielded from this radiation since if a camera tube of this type is to be used successfully, utilizing only the infrared radiation emitted by the detected objects themselves, its target sensitivity to infrared radiation must be very high and, consequently, its exposure to spurious infrared radiation very low.

Due to the nature of the deflecting and focusing electric field in this tube, any divergence in the electron beam or difference in electron velocities prevents the electrons from focusing to a point on the target. Thus the resolution of the tube is less than in a tube in which the electrons are focused to a point. Obviously then, a desirable electrostatic deflection and focusing system is one focusing an electron beam from a point to a point while bending it over a circuitous path, regardless of the differences in electron velocities or of the divergence of the beam.

Accordingly, an object of the present invention is the provision of an improved electrostatic deflection and focusing system.

Another object is the provision of an improved infrared camera tube with high resolution.

A further object is the provision of a system for producing a spherical electrical field for deflecting and focusing an electron beam over a circuitous path from substantially a point source to substantially a point object.

Still another object is the provision of a system for bending an electron beam over a circuitous path with substantially no aberrations.

These and other objects are achieved in a preferred embodiment of our invention in which eight conducting hemispherically-shaped electrodes, arranged in concentric pairs, produce a spherical electrical field that bends an electron beam through four 180° paths while deflecting and focusing it. Chromatic and spherical aberrations produced in the first two pairs of electrodes are cancelled by the action of the last two electrode pairs.

Figure 2:
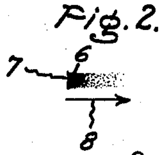
Figure 6:
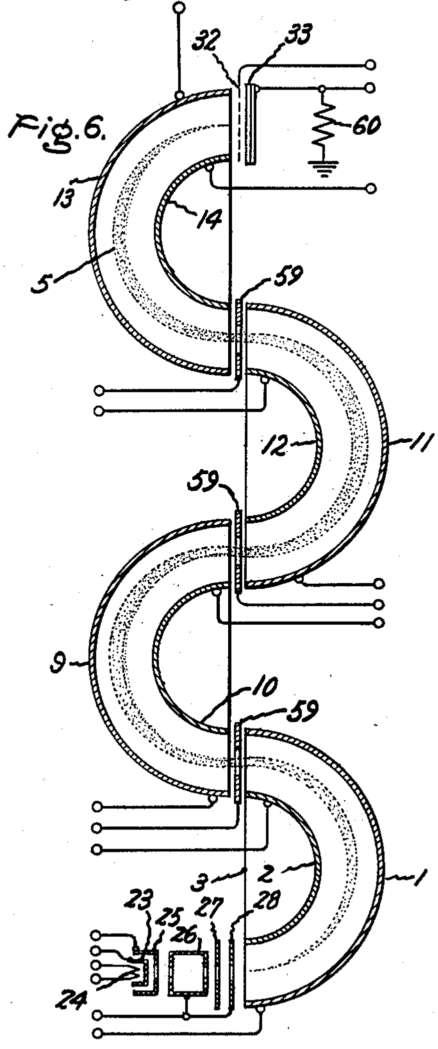
Figure 3:
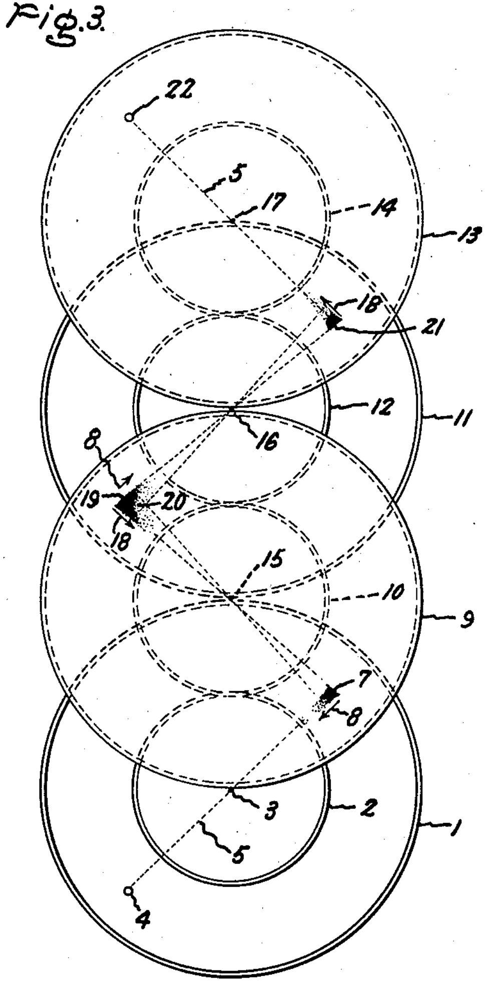
Figure 4:
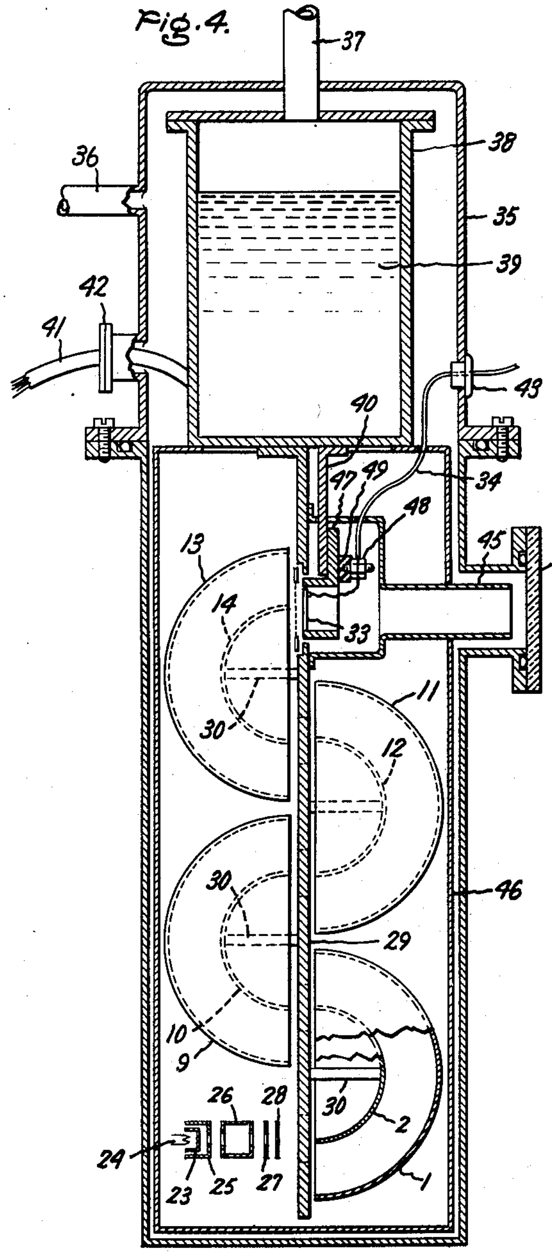
Figure 5:
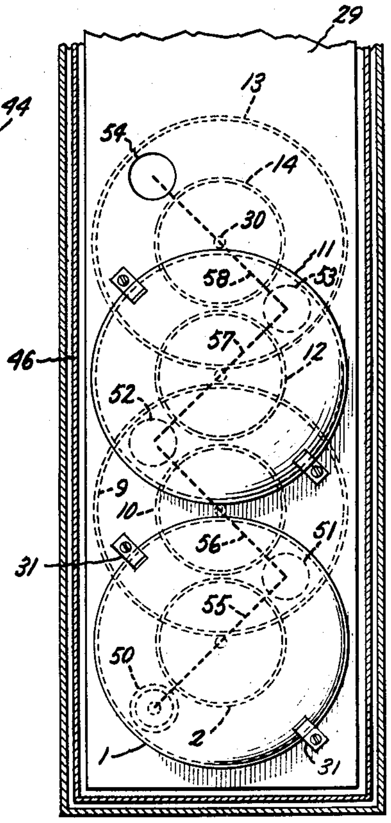

The novel features believed characteristic of our invention are set forth in the appended claims. The invention itself, together with further objects and advantages thereof, may best be understood by reference to the following description, taken in connection with the accompanying drawings, in which:

Fig. 1 is a cross-sectional view of a pair of concentric hemispherically-shaped conducting electrodes, Fig. 2 is an enlargement of the spread of an electron beam focused by an electrical field produced by voltages applied to the electrodes illustrated in Fig. 1, Fig. 3 is a plan view of a preferred deflection and focusing system embodiment of our invention comprising four concentric hemispherically-shaped conducting electrodes, Fig. 4 is a cross-sectional view along the center line of a preferred infrared camera tube embodiment of our invention, Fig. 5 is a plan view of the hemispherically-shaped electrodes of the tube of Fig. 4, and Fig. 6 is a developmental view taken along the beam paths in the four pairs of hemispherically-shaped electrodes illustrated in the camera tube of Fig. 4.

In Fig. 1 we have illustrated a pair of hemispherically-shaped conducting electrodes 1 and 2 of different radii that subtend the same angle and are concentric about the same point 3. The electrode radii may be selected as small as is practical to provide a compact unit: radii of 1½ and ¾ inches being nearly optimum for many infrared camera tube applications. The electrode material must either be conducting or be coated with conducting material. Also, it must be formable into hollow hemispheres. Copper is especially suitable since it is conducting and can be easily spun.

From a point 4 preferably midway between and at the edges of electrodes 1 and 2 an electron beam 5 emanates from a source not illustrated, but which may be a conventional electron gun. Beam 5 passes through the space between electrodes 1 and 2 under the influence of a spherical electrical field produced by direct voltages applied to electrodes 1 and 2 from a source (not illustrated). In so passing, beam 5 spreads to cover an area 6 extending from a point 7 midway between electrodes 1 and 2. Point 7 is on a line with points 3 and 4, as is explained in the above-mentioned patent application.

This spreading or diverging of beam 5 results from either or both an initial divergence and a difference in electron velocities. Unfortunately, many electron guns produce electron beams comprised of electrons having many different velocities. The paths of the electrons with different velocities significantly diverge.

If beam 5 did not diverge, it would follow a circular path terminating at point 7 rather than at an area 6. But due to the divergence, many of the electrons follow elliptical paths terminating not at point 7 but at points spread out in area 6 in the manner illustrated in Fig. 2. Most of the electrons arrive near point 7, the number away from point 7 tapering off in the direction towards point 3, indicated by arrow 8. If the width of area 6 is two mils, its length is approximately 10 mils.

Two types of aberration called spherical and chromatic aberration produce this spreading. Spherical aberration is associated with the initial divergence of the beam 5 and chromatic aberration with the different initial electron velocities. Only the spreading from spherical aberration is illustrated, to simplify the drawing. The spreading from chromatic aberration is also along the radial line defined by points 3, 4, and 7 but extends on both sides of point 7.

Perhaps these two types of aberrations can be better understood from a comparison in which the gravitational field of the earth is equated to the spherical electrical field between electrodes 1 and 2, projectiles are equated to the electrons, and an artillery field piece to the electron gun. If an artillery field piece fires projectiles at different angles of elevation, those fired at an angle of 45° travel further than those fired at greater and lesser angles. Likewise, of the electrons emitted into the space between electrodes 1 and 2, those entering without divergence travel the furthest, reaching point 7. But those initially diverging from this path fall short of point 7, causing beam 5 to spread.

As regards chromatic aberration, if the artillery field piece is maintained at a constant elevation and several projectiles fired with different amounts of powder so that they have different velocities, the projectiles land at different points. Similarly, the electrons entering the space between electrodes 1 and 2 with different velocities do not all arrive at point 7.

Referring now to Fig. 3, we have illustrated a preferred embodiment of our invention comprising four pairs of hollow hemispherically-shaped electrodes 1, 2; 9, 10; 11, 12 and 13, 14. They are preferably identical in order that the same direct voltages may be used on all of them. They are arranged to provide right angle zig-zag paths for beam 5, as in the above-mentioned application. Their centers 3, 15, 16 and 17 lie along a line. This arrangement of the beam paths is required not only to produce a conventional scan of the electron beam, as is explained in the above-mentioned application, but to produce cancellation of the spherical and chromatic aberrations of electron beam 5, as is explained below.

The electrode pairs are arranged in opposing relationship with adjoining spaces to provide a continuous path for the electron beam 5. Also, bisecting planes of adjacent electrode pairs intersect orthogonally along a line having a point common to the adjoining spaces of the electrode pairs. In the preferred embodiment, this point (e.g. point 7) is midway between the edges of the electrodes of each of the adjacent pairs.

As mentioned in the discussion of Fig. 1, beam 5 in passing between electrodes 1 and 2 spreads radially over an area 6. Then in passing between electrodes 9 and 10, it again spreads radially due to the previously mentioned chromatic and spherical aberrations. By the time it leaves, it has spread in a direction, indicated by arrow 18, towards the center 15 over an area initiating from a point 19 midway between the edges of electrodes 9 and 10. The lens action of the field between electrodes 9 and 10 reverses the spread of area 6, indicated by arrow 8.

The combined spreading produced by the aberrations in the passage of beam 5 between the electrodes of the first two pairs of electrodes produces a resultant spread 20, the electron density of which increases in a direction toward point 19. If beam 5 with its large tapering area 20 is utilized to scan the target electrode, it produces an electrical signal not containing as many of the variations, corresponding ot the infrared image, as it would have if a more compact electron beam of much smaller area is used.

Area 20 is actually spread in all directions from point 19, although a spread in only one quadrant is illustrated. If the effects of chromatic aberration were illustrated, the spread would be in all four quadrants.

Electrodes 11 and 12 are arranged in opposition to electrodes 9 and 10 and in parallel with electrodes 1 and 2. With this arrangement, the spread of electrons indicated by arrow 8 is directed toward the center 16 as it was directed towards the center 3 of electrodes 1 and 2 when beam 5 left the space between these electrodes. Also, the head of these electrons—point 19—is positioned midway between the edges of electrodes 11 and 12. Consequently, the effect of the electric field between these electrodes, as regards this one spreading, is the same as if these electrodes were placed directly underneath electrodes 1 and 2 to provide a complete circular path for beam 5. The result is, as is explained below, that this spreading decreases to zero in the passage of beam 5 between electrodes 11 and 12, leaving only the spreading indicated by arrow 18. The lens action of the field between electrodes 11 and 12 reverses this latter spreading, and thus it extends from a point 21 midway between the edges of electrodes 11 and 12 and also between the edges of electrodes 13 and 14.

The mechanics of the elimination of this spreading can be better understood by the consideration that this spreading is in the same direction when beam 5 enters the space between electrodes 11 and 12 as it was when beam 5 left the space between electrodes 1 and 2. Therefore, electrodes 11 and 12 have the same effect as if they had been positioned beneath electrodes 1 and 2 to form two concentric spheres. If beam 5 had been inserted in a spherical electrical field, produced by two concentric spheres, it would have spread or diverged to an area after the first 180° of its path but after the last 180° it would have converged to the point 4. That is, substantially all the electrons starting from point 4 would have returned to point 4. This can be proved mathematically by a consideration that a spherical electrical field is a radial force field in which the forces are inversely proportional to the square of the distance between the center of the concentric spheres and the particular electron of interest. This field is analogous to the gravitational field of, for example, the sun. The earth returns to the same position after a revolution about the sun.

The focusing and deflection system obviously cannot comprise two concentric spheres since then the electron gun and the target would have to occupy the same position. But we have obtained the same effect by the use of four pairs of hemispheres. The third pair of electrodes 11 and 12 completes this spherical path for the electron beam 5 as respect to the spread of electron beam 5 caused by the passage through the space between electrodes 1 and 2.

Similarly, the electrodes 13 and 14 eliminate the aberrations produced by the passage of electron beam 5 through electrodes 9 and 10. The spread of beam 5, indicated by arrow 18, when it enters the space between electrodes 14 and 15 is the same as it was when electron beam 5 left the space between electrodes 9 and 10. Consequently, the effect produced by electrodes 14 and 15 is the same as if these electrodes had been placed in contact with electrodes 9 and 10 to form two concentric spheres. Thus, after passage through the spaces between the four pairs of electrodes, the electron beam 5, which originated from a single point 4, converges to substantially a single point, indicated at 22, located midway between the edges of electrodes 14 and 15 and along the line extending through points 17 and 21. Obviously, the resolution obtained by the deflection of the small beam area at point 22 over a target electrode is much higher than if the electron beam indicated by area 20 were used.

In Fig. 4 we have illustrated an infrared camera tube utilizing the four pairs of electrodes illustrated in Fig. 3. Since this is a true cross-sectional view taken through the centers of the pairs of hemispherically-shaped electrodes, the path for the electron beam 5 cannot be seen. The electron gun and collector electrode assembly have both been illustrated as sectioned in the central plane thereof although it will be understood that they are actually displaced from the plane of the section of Figure 4 and centered about the openings 50 and 54 respectively of Figure 5. The source for electron beam 5 is an electron gun comprising a cathode 23 heated by a heating element 24. The electrical connections to these as well as the other components are not illustrated in order to simplify the drawing. The electrons are initially accelerated by a voltage applied to a first anode 25 and then are additionally accelerated by a more positive voltage applied to a second anode 26. The electrons are then focused approximately to a point by a lens system including focusing electrodes 27 and 28.

The four pairs of electrodes are mounted on a grounded heat-conducting plate 29 having apertures positioned to pass electron beam 5 between the pairs of electrodes. With plate 29, which may be formed from copper, at ground potential, the electrodes must be mounted with insulators. The inner electrodes of each pair are illustrated as mounted to plate 29 by insulating posts 30 and the outer electrodes by insulating tabs 31, illustrated in Fig. 5.

When electron beam 5 emanates from the electron gun, it is affected by spherical electric fields produced by voltages applied to the electrodes. If the electrode pairs are identical, the direct voltages on the inner electrodes of the pairs may be the same and those on all of the outer electrodes may be the same. The direct voltages on each electrode pair depend on the radii of these electrodes. For focusing, the direct voltage difference between the voltage applied to the inner electrode, the beam voltage, and the voltage applied to the outer electrode should be in the same ratio as the reciprocal of their respective distances from the center of curvature of the electrodes. All of these voltages are considered with respect to the potential of the cathode 23 of the electron gun. To restate this, if $V_i$, $V_b$, and $V_o$ are, respectively, these direct voltages, and $r_i$, $r_b$, and $r_o$ are, respectively, the radius of the inner electrode, the distance from the center of the electrodes to the point where the beam is injected, and the radius of the outer electrode, then the voltages and these distances should, for best focusing, agree with the equation:

$$\frac{V_i - V_b}{V_b - V_o} = \frac{1/r_i - 1/r_b}{1/r_b - 1/r_o}$$

If the beam energy is, say, 220 volts, and if the beam 5 is injected midway between the indicated electrodes of the first pair, suitable direct voltages for the inner and outer electrodes may be, respectively: 440 volts and 110 volts. Of course, the direct voltages on the inner electrodes should be positive with respect to the direct voltages on the outer electrodes.

If it is desired that the undeflected electrons follow paths that are along arcs of circles, then the direct voltages should also agree with the equation:

$$V_b = \frac{r_i r_o (V_i - V_o)}{2 r_b (r_o - r_i)}$$

There is more latitude in the selection of alternating deflection voltages. For any condition of operation, the alternating deflection voltages on each pair of electrodes preferably vary inversely with the radii. Also, the deflection voltages may be applied to just two pairs of electrodes or to all four pairs. Of course, to obtain areawise deflection, the deflection voltages must be applied to either the first or third pairs of electrodes, and to either the second or fourth pairs of electrodes.

Consider the deflection voltages when just two pairs of electrodes are energized with deflection voltages. For the indicated electrode dimensions and direct voltages, suitable deflection voltages may be approximately 60 volts peak on the inner electrodes and 30 volts peak on the outer electrodes. These deflection voltages on each pair of electrodes should be out of phase to provide a push-pull force on the electrons. With these voltages, a target electrode of the order of 2 centimeters in diameter may be scanned with a resolution of the order of a few hundredths of millimeters.

Now consider the voltages when they are applied to all four pairs of electrodes. This operation may be desirable since the required deflection voltages are lower in magnitude as compared to the required deflection voltages when they are applied to only two pairs of electrodes. Again, the deflection voltages on each pair of electrodes vary inversely with the radii of electrodes. Also, on each pair of electrodes, the deflection voltages should be out of phase. And in addition, the deflection voltages on similar electrodes for the first and third pairs of electrodes should be out of phase, and those on similar electrodes for the second and fourth pairs of electrodes should be out of phase. If this last relationship is not maintained, the deflection action of the first pair of electrodes is cancelled by the deflection action of the third pair of electrodes. Similarly, the deflection actions of the second and fourth pairs of electrodes cancel.

There are other combinations of deflection voltages that may be desirable. It may be desired to use deflection voltages that are not equal. For example, assume the desired deflection in one direction can be obtained by applying 60 volts peak on the inner electrode and 30 volts peak on the outer electrode of the same pair. Then, approximately the same deflection may be obtained by applying unequal voltages to two pairs of electrodes. In this case, 30 volts peak may be applied on the inner electrode and 15 volts peak on the outer electrode of the first pair. And on the third pair, 90 volts peak may be applied on the inner electrode and 45 volts peak on the outer electrode. This will provide approximately the same total deflection as the 60 and 30 volts on the one pair of electrodes. With this arrangement, the voltages on similar electrodes of the two pairs are in phase. Although this arrangement requires larger deflection voltages, it has the advantage that the aberrations of the beam caused by the fringe fields at the edges of the electrodes are more completely cancelled since, as can be shown, the beam with these deflection voltages is displaced gradually and thus is more nearly acted upon by the same fringe fields.

Electron beam 5, after passing through the four pairs of electrodes, is decelerated to approximately zero volts by the field between a screen electrode 32 and the target electrode 33.

Target 33 comprises two layers of material. The layer upon which beam 5 impinges is formed from photoconductive material such as germanium or silicon suitably doped with "impurities" such as gold, copper, cobalt, etc. having a resistivity which varies inversely with the intensity of the infrared radiation falling thereon. In other words, areas subject to greater intensity infrared radiation have lower resistivity than areas subject to infrared radiation of lesser intensity. The other layer is a semi-transparent layer of conducting material such as a thin evaporated metal film, e.g. gold. Or it could be a highly doped surface layer of the semiconductor.

The electrical output from the target is through a lead 34 connected to the conducting layer.

Since the sensitivity of such an infrared target requires that it be operated at a very low temperature, the target should be protected from infrared radiation from warm objects in the equipment around the camera tube. Thus, in Fig. 4 we have illustrated the target electrode 33 as positioned in a low temperature vessel called a Dewar vessel. It comprises an outer shell 35 having an exhaust tube 36. It also has an inlet tube 37 leading to an inner vessel 38 containing a low temperature coolant 39 such as liquid hydrogen or nitrogen. Vessel 38 is made from a heat conducting material such as brass to provide heat flow from plate 29 and also from a plate 40, to which electrode 33 is mounted. Both plates are connected to vessel 38 to permit heat to flow up into liquid coolant 39 thereby providing a low-temperature environment for the target 33. The interior of the vessel 35 is maintained at a high vacuum by means of a vacuum pump (not shown) connected to exhaust pipe 36. This high vacuum prevents the conduction of heat from the exterior of the camera tube into the coolant 39 while providing a non-collison path for electron beam 5.

All of the wires from the interior of the tube except wire 34 are brought out in a cable 41 through a vacuum seal 42. Wire 34 is brought out through another vacuum seal 43 at a distance from cable 41 so that currents in the wires in cable 41 will not be so apt to induce voltages in wire 34.

Shell 35 has a port that is vacuum sealed by a window 44 that may, for example, be formed of an infrared transmitting material such as arsenic sulfide. A cylindrical shield 45 extending into this port shields target 33 from the infrared radiation emitted by vessel 35 which is at room temperature.

An interior heat shield 46, which may be formed of aluminum, is provided completely around the camera section with the exception of the port through which the infrared energy passes. It is connected to vessel 38 and thus maintained at a very low temperature for more effective shielding.

Target 33 is mounted on a heat conducting piece of material 47, having an aperture therein in which target 33 is mounted. If material 47 is electrically conducting, the conducting layer in target electrode 33 should not extend to the edges where it might be grounded by material 47. A terminal post 48, mounted by an insulator 49 to material 47, secures wire 34 against movement.

The path of the electron beam 5 through the four pairs of electrodes is more evident in the plan view of these electrodes illustrated in Fig. 5. It is seen that plate 29 is provided with five apertures 50, 51, 52, 53 and 54 positioned to pass electron beam 5. The electron beam 5 initially passes from the electron gun through aperture 50 and into the space between electrodes 1 and 2. It follows a path 55 between electrodes 1 and 2 and then passes through aperture 51 into the space between electrodes 9 and 10. It has a path 56 between electrodes 9 and 10 that is normal to path 55. It then passes through aperture 52 and follows a path 57 between electrodes 11 and 12 that is normal to path 56. After its passage through aperture 53, beam 5 follows a final path 58 between electrodes 13 and 14. Path 58 is normal to path 57. Then it passes through aperture 54 to strike the target electrode 33.

In Fig. 6 we have illustrated a cross-sectional developmental view of the main parts of the camera tube, which view is taken in the planes of the zig-zag path of the electron beam 5. For convenience, these planes are illustrated as being in a simple plane but, of course, actually are in four different planes. In Fig. 6 we have also illustrated some electrodes 59 between the electrode pairs. Electrodes 59, which have apertures for the passage of beam 5, are mounted in the apertures 51, 52, and 53 in plate 29 provided for the passage of electron beam 5, and are insulated therefrom by insulating O-shaped washers not illustrated. The potentials on electrodes 59 are adjusted to reduce the effect of the fringing field at the edges of the pairs of electrodes which otherwise would be very large due to the presence of the grounded plate 29.

Also in Fig. 6 we have shown a resistor 60 across which the output voltage from the target electrode 33 is developed.

The operation of our camera tube is similar to that of a television camera tube using a target electrode with photoconductive material. An infrared image is focused on target electrode 33 by a lens system (not illustrated). This image causes the conductivity over the regions of target 33 to vary in point-by-point correspondence with the intensity of the infrared image. Then, the electrons deposited by beam 5 on the surface of the photoconductive material flows to the conducting layer as a function of the intensity of the infrared image. As electron beam 5 deflects over the photoconductive material, it brings the points of the surface to approximately the potential of cathode 23. The number of electrons required for this at any point is the same as the number of electrons that leaked from that point through the photoconductive material to the conducting layer. Thus, the number of electrons suddenly deposited by the beam 5 at any point depends upon the intensity of the infrared image at that point. When the beam 5 deposits electrons at a point it induces, by capacitor action, a corresponding flow of electrons away from target electrode 33 through resistor 60. Thus, as the electron beam 5 deflects over the area of target electrode 33, a voltage is generated across resistor 60 corresponding to the intensity of the infrared image. This voltage can then be amplified and utilized in a television receiver arrangement to produce a visible image of the infrared image.

In the above, we have not explained how the deflection of the electron beam is obtained by the deflection voltages on the hemispherically-shaped electrodes. This deflection action is identical to that explained in the above-identified application. That is, the deflection voltages on the electrodes 1, 2, and 11, 12 produce deflection of the electron beam 5 in a direction parallel to the lines through points 7, 3, and 4 and also points 21, 16 and 19. The deflection voltages on electrodes 9, 10 and 13, 14 produce deflection of the electron beam in a direction parallel to the lines defined by points 7, 15, and 19 and 22, 17 and 21. Since these two deflections are at right angles, the desired and conventional electron beam deflection is obtained.

We have not illustrated the interior surfaces of the large electrodes and the outer surfaces of the inner electrodes as being blackened to absorb infrared radiation. However, they should be in an infrared tube application.

Although we have described our invention in relation to an infrared camera tube, it should be apparent that it is applicable for electron beam focusing and deflection even though infrared radiation from the electron gun is not a problem. Some of its nonexclusively infrared application advantages include deflecting the beam to strike the target orthogonally, and thus with the same velocity over the whole target area. In low beam voltage applications, this is very important. Also, our system being electrostatic, is lighter and requires less power than does a magnetic system. Furthermore, our system has less aberrations and defocusing than conventional electrostatic and deflection systems.

From the above explanation, it should be apparent that what is desired is a spherical electrical field in the vicinity of the electric beam path. This field is closely obtained by utilizing hemispherically-shaped electrodes as is illustrated. But if in some applications the field requirements are not too stringent, fields approximating those of spherical electrical fields can be obtained by using portions of hemispheres, each of which extends through an angle of 180°.

Although all four electrode pairs are illustrated as identical, they need not be. However, the sizes should be such that the radii of the electron beam paths between the first and third electrode pairs are equal, and between the second and fourth electrode pairs are equal. These relationships are required for the cancellations of the aberrations, since these aberrations are dependent upon the radii of the electron beam paths.

While the invention has been described with respect to specific embodiments, it would be appreciated that many modifications and changes may be made by those skilled in the art without departing from the spirit of our invention. We intend, therefore, by the appended claims, to cover all such modifications and changes as fall within the true spirit and scope of our invention.

What we claim as new and desire to secure by Letters Patent of the United States is:

1. An electrostatic deflection and focusing system comprising four pairs of hemispherically-shaped conducting electrodes, the electrodes of each of said pairs of electrodes being of different size and mounted concentrically with the small electrode of each of said pairs mounted within the larger electrode, the centers of all of said pairs of electrodes being arranged along a line, each pair of said pairs of electrodes being alternately arranged with the spaces between the electrodes of adjacent pairs adjoining to provide four continuous electron beam paths, each of which extends through an angle of 180°.

2. An infrared camera tube comprising the electrostatic deflection and focusing system defined in claim 1 and an electron source for producing approximately a point source of an electron beam at approximately a point midway between and at the edges of the pair of electrodes at one end of said pairs of electrodes, and an infrared target mounted between and at the edges of the pair of electrodes at the end of said pairs of electrodes other than said one end.

3. An electrostatic system for deflecting and focusing an electron beam comprising a first pair of hollow hemispherically-shaped conducting electrodes of different radii mounted concentrically to subtend the same solid angle, a second pair of hollow hemispherically-shaped conducting electrodes of different radii mounted concentrically to subtend substantially the same solid angle and in opposed relationship with said first pair of electrodes such that the center lines between the electrodes of each of said first and second pairs of electrodes join in a continuous manner, a third pair of hollow hemispherically-shaped conducting electrodes of different radii mounted concentrically to subtend the same solid angle and in opposed relationship with said second pair of electrodes such that the center lines between the electrodes of each of said second and third pairs of electrodes join in a continuous manner, and a fourth pair of hollow hemispherically-shaped conducting electrodes of different radii mounted concentrically to subtend the same solid angle and in opposed relationship with said third pair of electrodes such that the center lines between the electrodes of each of said third and fourth pairs of electrodes join in a continuous manner.

4. The electrostatic system as defined in claim 3 wherein the centers of said pairs of electrodes extend along a line.

5. In an electron beam discharge device, a source of electrons, and means for producing a spherical electrical field for focusing and deflecting the electrons from said source, said field comprising four sections, each of which extends through an angle of 180° to form a continuous electron beam path.

6. In an electron beam discharge device, a source of electrons, and four pairs of electrodes for producing four spherical electrical fields for focusing and deflecting the electrons originating from said source, each of said pairs of electrodes extending through an angle of 180° to form an electrical field extending through 180°, said pairs of electrodes being arranged to form four electron beam paths that are continuous and which for adjacent electron beam paths are normal.

7. In an electron beam discharge device, a source of electrons, and four pairs of electrodes for producing four spherical electrical fields for focusing and deflecting the electrons originating from said source, each of said pairs of electrodes extending through an angle of 180° to form an electrical field extending through 180°, said pairs of electrodes being arranged with the open sides of adjacent pairs of electrodes facing oppositely to form four electron beam paths that are continuous and that for adjacent paths are mutually perpendicular.

References Cited in the file of this patent

UNITED STATES PATENTS

| | | |
|---|---|---|
| 2,256,461 | Iams | Sept. 16, 1941 |
| 2,380,225 | Fleming-Williams | July 10, 1945 |
| 2,570,208 | Clark | Oct. 9, 1951 |
| 2,721,949 | Gund | Oct. 25, 1955 |
| 2,842,710 | Van der Meer | July 8, 1958 |

FOREIGN PATENTS

| | | |
|---|---|---|
| 56,225 | Holland | May 15, 1944 |